United States Patent Office 3,485,834
Patented Dec. 23, 1969

3,485,834
HYPOGLYCEMIC SULFONAMIDO-s-TRIAZINES
Hans Suter, Dorflingen, and Hans Zutter, Schaffhausen, Switzerland, assignors to Swiss Serum and Vaccine Institute and Institute for the Research of Infectious Diseases, Bern, Switzerland
No Drawing. Filed June 8, 1966, Ser. No. 555,990
Claims priority, application Switzerland, June 17, 1965, 8,487/65
Int. Cl. C07d 55/12; A61k 27/00
U.S. Cl. 260—249.5     7 Claims

ABSTRACT OF THE DISCLOSURE

Sulfonamides of the formula

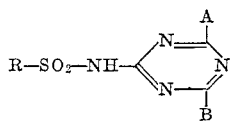

and their water-soluble, polysiologically tolerated salts are effective oral blood-sugar-level depressants, in the formula, A being lower-alkoxy or lower-alkoxy-lower-alkoxy B being as A or chlorine, and R being butyl, hexyl, pentyl or phenyl-lower-alkyl with or without lower alkyl, lower alkoxy, chlorine, or acetyl as substituents in the benzene ring. Synergistic physiological results are achieved with mixtures of 2-β-phenylethanesulfonamido-4-chloro-6-methoxy-s-triazine and 2-β-phenylethanesulfonamido-4,6-dimethoxy-s-triazine or their sodium or calcium salts.

---

This invention relates to substances capable of lowering the blood sugar level after oral administration and to a method of preparing the same.

We have found that s-triazines lower the blood sugar level when they are of the formula

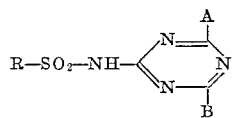

wherein R is butyl, pentyl, hexyl, phenyl-lower-alkyl, lower-alkoxy-phenyl-lower-alkyl, chlorophenyl-lower-alkyl, lower-alkyl-phenyl-lower-alkyl, or acetyl-phenyl-lower-alkyl, A and B are lower alkoxy or lower alkoxy-lower alkoxy, and one of A and B may also be chlorine. They may be administered in the free form or in the form of their salts with a physiologically tolerated base, and preferably as water-soluble salts with physiologically tolerated bases.

Typical representatives of R are:

| | |
|---|---|
| β-phenylethyl | β- and γ-phenylpropyl |
| benzyl | methylbenzyl |
| methoxybenzyl | methoxyphenylethyl |
| ethoxybenzyl | acetylbenzyl |
| chlorobenzyl | ethoxyphenylethyl |
| hexyl | pentyl |
| butyl | |

Typical representatives of A and/or B are:

| | |
|---|---|
| methoxy | ethoxy |
| propoxy | isopropoxy |
| methoxyethoxy | ethoxyethoxy |
| propoxyethoxy | isopropoxyethoxy |
| methoxypropoxy | |

The compounds of the invention in which R is aralkyl, at least one of A and B is alkoxy and the other is chlorine if not both are alkoxy have been found to have the most desirable physiological properties.

The preferred compounds are the 2-β-phenylethanesulfonamido-4,6-dialkoxy-s-triazines and the 2-β-phenylethanesulfonamido-4-chloro-6-alkoxy-s-triazines, and optimum results have been achieved when both substituents in positions 4 and 6 of the triazine ring were methoxy or ethoxy and when one was chlorine and the other was methoxy.

The compounds of the invention are preferably prepared by sequentially reacting cyanuric chloride with a sulfonamide of the formula R—SO$_2$ and with an alcohol of the formula R'—OH wherein R' is lower alkyl or lower-alkoxy-lower-alkyl. The sequence in which the two reactions are performed is practically irrelevant.

When cyanuric chloride is first reacted with the sulfonamide, preferably in the form of its alkali metal salt and in an inert solvent medium between —10° C. and about 50° C., there is obtained the corresponding 2-sulfonamido-4,6-dichloro-s-triazine, which is further reacted with the alcohol in the form of a metal alcoholate or in the presence of a basic condensation agent or acid acceptor. Depending on the ratio of the reactants, there is obtained either a 2-sulfonamido-4,6-dialkoxy-s-triazine or a 2-sulfonamido-4-alkoxy-6-chloro-s-triazine. The second stage of the reaction is also preferably performed at a temperature not much higher than room temperature, that is, between —10° C. and 50° C.

When cyanuric chloride is reacted first with an alcohol R'OH in the presence of a basic condensation agent such as sodium bicarbonate or collidine, there is obtained either a 2,4-dichloro-6-alkoxy-s-triazine or a 2-chloro-4,6-dialkoxy-s-triazine, depending on the reaction condition, and the same compounds as above are ultimately obtained by reaction with a sulfonamide of the formula R—SO$_2$—NH$_2$ in the form of a salt, preferably an alkali metal salt.

Compounds of the invention may also be prepared by reacting a 2,4,6-trialkoxy-s-triazine with a salt of a sulfonamide, whereby one of the alkoxy substituents is replaced by the radical of the sulfonamide according to the formula.

$$R—SO_2—NHNa + C_3N_3(OR')_3 \rightarrow R—SO_2—NNa—C_3N_3(OR')_2 + R'OH$$

Ultimately, a sulfonyl chloride of the formula R—SO$_2$—Cl or an analogous sulfonic anhydride or sulfonic acid ester may be reacted with a 2-amino-s-triazine of the formula H$_2$N—C$_3$N$_3$(OR')$_2$. The reaction is only of limited applicability because of the instability of the triazine ring under the reaction conditions (see Roblin, J.A.C.S. 64 (1942) 2902).

The 2-sulfonamido-s-triazines of the invention prepared by the methods indicated above may be further reacted in an obvious manner with suitable bases to form physiologically tolerated salts. The sodium salts are generally most convenient for pharmaceutical use, but calcium salts combine desirable properties in an advantageous manner.

The compounds of the invention are characterized by their sustained effect on the blood sugar level when administered orally. The extent to which they can lower the blood sugar level is evident from Table 1 which lists the maximum percentage reduction of the blood sugar of rabbits after oral administration of the listed compounds in doses of 250 mg./kg. The compounds are identified in Table 1 in their free acid form.

TABLE 1

| Compound | No. | Percent |
|---|---|---|
| 2-benzylsulfonamido-4,6-bis-(β-methoxy-ethoxy)-s-triazine. | I | 30 |
| 2-β-phenylethanesulfonamido-4-chloro-6-ethoxy-s-triazine. | II | 27 |
| 2-butylsulfonamido-4-chloro-6-methoxy-s-triazine | III | 17 |
| 2-β-phenylethanesulfonamido-4,6-dimethoxy-s-triazine. | IV | 35 |
| 2-β-phenylethanesulfonamido-4,6-diethoxy-s-triazine. | V | 40 |

The Roman numerals in Table 1 are being employed hereinafter for identification of the compounds listed, and the following compounds will be similarly identified:

| Compound: | No. |
|---|---|
| 2 - β - phenylethanesulfonamido - 4 - chloro-6-methoxy-s-triazine | VI |
| 2-Benzylsulfonamido-4,6-dimethoxy-s-triazine | VII |

Table 2 shows blood sugar levels in rats at various times after administration of the oral hypoglycemic agents of the invention. The tests whose results are listed in Table 2 were performed on groups of twelve male and female rats to whom the compound of the invention were applied through a tube introduced into the esophagus. The compounds were dispersed in water with Tween 80 in a concentration of 50 mg. per ml. The results are expressed in percent change of blood sugar as compared to the average blood sugar level of control groups of 24 rats.

TABLE 2

| Compound No. | Dosage, mg./kg. | Change in blood sugar level after | | | | |
|---|---|---|---|---|---|---|
| | | 2 Hrs. | 5 Hrs. | 8 Hrs. | 12 Hrs. | 24 Hrs. |
| VI | 250 | −11.85 | −17.32 | −16.89 | −17.81 | −19.27 |
| IV | 250 | −9.91 | −12.19 | −14.93 | −3.90 | |
| VI+IV | 125 ea. | −13.85 | −25.15 | −25.04 | −32.31 | −5.03 |
| V | 250 | −6.93 | −25.15 | −18.2 | −3.00 | −9.74 |

As is evident from Table 2, Compounds VI and IV synergistically enhance the effect of each other. Combined doses of 125 mg./kg. of each of the two compounds produce a higher and more uniform reduction of blood sugar over more than 12 hours than either compound individually when applied at a rate of 250 mg./kg.

Neither the individual compounds of the invention nor their synergistic combinations produce sharp peaks of hypoglycemia and thus provide a measure of safety against hypoglycemic shock and coma when employed in excessive doses.

The s-triazines of the invention are readily excreted through the urinary tract and are well tolerated during extended use in a manner characteristic of known s-triazine compounds. They are superior in this respect to otherwise similar pyrimidine derivates because they do not affect vital metabolic processes. The compounds of the invention may be safely employed over periods too long to permit the use of pyrimidine derivatives without close supervision.

A dosage of 250 mg./kg. is much higher than the rate at which the compounds of the invention produce the desired physiological effects. Yet, no effects other than hypoglycemia have been observed with the oral application of the compounds at this rate. The toxicity ($LD_{50}$) for warm-blooded animals is approximately 2.5 g./kg.

The 2-sulfonamido-s-triazines of the invention are relatively strong acids. They can be titrated with alkali metal hydroxides, and can be converted to practically neutral, stable salts and salt solutions. Such stable, water-soluble salts are more readily resorbed by living organisms than the free acid forms of the compounds which are soluble in water in much smaller amounts.

The salts are so stable that they may be used over a wide range of pH values. They are much superior in this respect to the sulfonylurea derivatives which are accepted hypoglycemic agents, and have only limited stability in alkaline media.

The strong hypoglycemic activity of the compounds of the invention is surprising in view of the fact that the known-2-sulfonamido-s-triazine do not produce pharmacologically significant hypoglycemic effects. The known compounds are chemotherapeutic agents for the treatment of infectious diseases, and thus have properties which are undesirable in hypoglycemic agents.

The following examples further illustrate the invention, but it will be understood that the invention is not limited thereto.

EXAMPLE 1

(a) 80 g. β-phenylethanesulfonamide were converted into the sodium salt by reaction with the stoichiometrically equivalent amount of sodium ethylate (0.432 mole) in about 400–500 ml. methanol.

(b) 36.8 g. cyanuric chloride (0.2 mole) were dissolved in 160 ml. dioxane, and 82.8 g. dry sodium β-phenylethanesulfonamide (0.4 mole) were added to the solution with agitation. The reaction was slightly exothermic, and the reaction vessel was cooled externally to maintain room temperature in the reaction mixture. When the reaction had subsided, the mixture was agitated vigorously for about five hours longer, and was then evaporated in a vacuum at about 40° C. The viscous residue consisted of the sodium salt of 2-β-phenylethanesulfonamido-4,6-dichloro-s-triazine, NaCl, and β-phenylethanesulfonamide. It was digested with about 800 ml. water. The β-phenylethanesulfonamide was recovered by filtration with suction as an undissolved solid.

The filtrate was poured gradually into 200 ml. N—HCl, whereby 2 - β - phenylethanesulfonamido-4,6-dichloro-s-triazine was precipitated at once as a crystalline solid. It was separated from the mother liquor by filtration with suction, and dried, The yield was 63.6 g. (95.5%). M.P. 181–183° C. The product was identified by its equivalent weight:

Calculated for $C_{11}H_{10}Cl_2N_4O_2S$, 333.19. Found, 334.02.

The intermediate so obtained can be purified by recrystallization from warm methyl acetate by addition of petroleum ether (B.P. 40°–60° C.) if so desired.

(c) 37 g. 2-β-phenylethanesulfonamido-4,6-dichloro-s-triazine (0.111 mole) were added batchwise with stirring to an ethanol solution of 0.333 mole sodium ethylate. The temperature of the reaction mixture was kept at about 20–25° C. by cooling, and stirring was continued for several hours after the initial reaction had subsided. The reaction mixture was evaporated in a vacuum, the residue was taken up in 200 ml. water, and insoluble matter was removed by filtration. The filtrate was carefully acidified with dilute hydrochloric acid, whereby an oily precipitate was formed which crystallized fairly rapidly upon being seeded.

33.18 g. crude 2-β-phenylethanesulfonamido-4,6-diethoxy-s-triazine (86% yield) having a melting point of 77–80° C. were obtained. The material (Compound V) was recrystallized without significant loss from about 360 ml. diisopropyl ether, and the purified material had a melting point of 81–83° C. It was identified by its equivalent weight and by elementary microanalysis.

Calculated for $C_{15}H_{20}N_4O_4S$: Equ. wt.—352.40; C, 51.12%; N, 15.90%; S, 9.1%. Found: Equ. wt.—351.1; C, 51.29%; N, 15.67%; S, 9.08%.

Compound V is only sparingly soluble in water, but very readily soluble in methanol, ethanol, isopropanol, acetone, ethyl acetate, and glacial acetic acid. The sodium salt, which dissolves very easily in water, was prepared by dissolving the free, acid Compound V in equivalent amounts of aqueous solutions of NaOH, $Na_2CO_3$ and $NaHCO_3$. The calcium salt also is water soluble and was prepared from Compound V by means of an equivalent amount of calcium hydroxide.

EXAMPLE 2

41.6 g. 2-β-phenylethanesulfonamido-4,6-dichloro-s-triazine (0.125 mole) were prepared as described in Example 1, and were added batchwise to a methanol solution of 0.375 mole sodium methylate (about 250 ml.) at 15–25° C. When the reaction had subsided, the mixture was stirred for a few hours longer, and was then evaporated in a vacuum, whereupon the residue was taken up in 250 ml. water, insoluble material was removed by filtration, and the filtrate was acidified with 65 ml. 2-N hydrochloric acid. 2-β-phenylethanesulfonamido-4,6-dimethoxy-s-triazine (Compound IV) was precipitated as a viscous, though mass whose crystallization was induced by rubbing with a glass rod, decanting of the supernatant liquid, addition of pure water, and seeding. It was filtered with suction, washed, and dried. The yield was 35.25 g. (87%), the melting point 110–112° C.

Compound IV was identified by its equivalent weight and by elementary microanalysis:

Calculated for $C_{13}H_{16}N_4O_4S$: Equ. wt.—324.35; C, 48.14%; N, 17.28%; S, 9.89%. Found: Equi. wt.—324.2; C, 48.33%; N, 17.42%; S, 9.98%.

Compound IV can be purified by dissolution in isopropanol and precipitation by water. It is insoluble in water and in low-boiling petroleum fractions (benzine), very readily soluble in methanol, acetone, chloroform, and glacial acetic acid. It is also soluble in isopropanol and warm ethyl ether. It dissolves in aqueous alkaline solutions, even in sodium bicarbonate solution, to form the corresponding salts. The calcium salt is prepared from the free, acid compound by the addition of an equivalent amount of calcium hydroxide, and is freely soluble in water. The solutions of the salts are practically neutral.

EXAMPLE 3

35 g. 2-β-phenylethanesulfonamido-4,6-dichloro-s-triazine (0.105 mole) were dissolved in 360 ml. lukewarm methanol. The solution was then cooled to 5° C., and 203 ml. of a 1.035 N solution of sodium methylate in methanol were added drop by drop with stirring over a period of 90 minutes, the temperature being held to a maximum of 20° C. A crystalline precipitate initially formed, but was dissolved as the reaction proceeded. Stirring at room temperature was continued thereafter for one hour, and the reaction mixture was evaporated to dryness in a vacuum at approximately 35° C. The residue, which consisted of the sodium salt of 2-β-phenylethanesulfonamido-4-chloro-6-methoxy-s-triazine (Compound VI) and sodium chloride, was dissolved in 240 ml. water, and a resinous product was precipitated from the solution with 120 ml. N-hydrochloric acid.

The supernatant aqueous liquid was decanted, and crystallization of the gummy residue was induced by rubbing with fresh water and by seeding. The yield of crude crystalline Compound VI was 31.1 g. (90%), the melting point 127–130° C. The material was recrystallized from a mixture of isopropanol and diisopropyl ether, whereby 21.2 g. (61.5%) of a purified substance of M.P. 132–133° C. were obtained. The compound was identified by its equivalent weight and by elementary microanalysis:

Calculated for $C_{12}H_{13}ClN_4O_3S$: Equ. wt.—328.77; C, 43.82%; N, 17.04%; Cl, 10.78%; S, 9.75%. Found: Equ. wt.—328.2; C, 43.81%; N, 16.92%; Cl, 10.63%; S, 9.91%.

Compound VI is practically insoluble in water. Its saturated solutions in methanol and ethanol contain 1–2% at room temperature, about 30–40% at boiling temperature. It is freely soluble even at room temperature in acetone, ethyl acetate, and particularly in chloroform and glacial acetic acid. Its solubility in cold diethyl ether, diisopropyl ether, and in benzine is limited.

The sodium salt of Compound VI is obtained by dissolving the free acid compound in an aqueous solution of equivalent amounts of NaOH, $Na_2CO_3$, or $NaHCO_3$. It is very readily soluble in water. The calcium salt is also water soluble, and is prepared by dissolving the free compound in an aqueous suspension of the equivalent amount of calcium hydroxide.

EXAMPLE 4

(a) 80 ml. ethanol were added to a solution of 100 g. cyanuric chloride in 550 ml. acetone, and 146 g. 2,4,6-trimethylpyridine (s-collidine) were admixed drop by drop with good cooling. The mixture was stirred for 3–4 hours at 40° C., whereby collidine hydrochloride was precipitated. It was filtered off with suction, the filtrate was diluted with much diethyl ether, and was extracted repeatedly with water. The ether solution was fractionated, and the fraction boiling at 4 mm. Hg between 88 and 100° C. was collected. It largely crystallized when stored in a refrigerator. The crystals were filtered from the mother liquor and recrystallized from petroleum ether (B.P. 40–60° C.). Approximately 40 g. pure 2,4-dichloro-6-ethoxy-s-triazine of M.P. 34–35° C. were obtained.

(b) 41.2 g. 2,4-dichloro-6-ethoxy-s-triazine and 88 g. sodium β-phenylethanesulfonamide in approximately one liter dioxane were stirred for five hours at about 90° C. The reaction mixture was evaporated in a vacuum, and the residue was taken up with shaking in 500 ml. water and 800 ml. ethyl ether.

Carbon dioxide gas was passed through the slightly alkaline aqueous phase, whereby a small residual amount of the sodium salt was converted to the free sulfonamide and precipitated. The precipitate was filtered off after an hour, and the desired product was precipitated from the filtrate with dilute hydrochloric acid. The precipitate at first was a viscous oil, but was converted into a crystalline mass by repeated replacement of the supernatant liquid with water, rubbing, and seeding.

50.6 g. 2-β-phenylethanesulfonamido-4-chloro-6-ethoxy-s-triazine (Compound II) of M.P. 110–112° C. were obtained after recrystallization from isopropanol/water (67% yield).

Calculated for $C_{13}H_{15}ClN_4O_3S$: Equ. wt.—342.74; C, 45.5%; H, 4.42%; N, 16.35%; S, 9.34%. Found: Equ. wt.—343.3 l; C, 45.4%; H, 4.67%; N, 16.20%; S, 9.46%.

Compound II is only slightly soluble in benzine and cold water, but readily soluble in hot water, in methanol, ethanol, acetone, ethyl acetate, benzine, chloroform, and glacial acetic acid. It forms alkali metal salt solutions in water which are precisely neutral.

EXAMPLE 5

(a) 100 g. cyanuric chloride were reacted with methanol (300 ml.) in the presence of 90 g. sodium bicarbonate and 30 ml. water to 75.5 g. 2-chloro-4,6-dimethoxy-s-triazine.

(b) 40 g. benzylsulfonamide were converted into the sodium salt by reaction with 0.216 mole sodium ethylate in about 200–250 ml. methanol.

(c) 17.6 g. (0.1 mole) 2-chloro-4,6-dimethoxy-s-triazine and 38.6 g. (0.2 mole) sodium benzylsulfonamide were refluxed gently for about 8 hours in 500 ml. dioxane, and the reaction mixture was then evaporated to dryness. The residue was taken up with shaking in 250 ml. water and 330 ml. ethyl ether, and was then further worked up in the manner described in detail in Example 4.

There were obtained 24.5 g. crude 2-benzylsulfonamido-4,6-dimethoxy-s-triazine (79% yield) having a melting point of 125–130° C. which were reprecipitated from 75 ml. isopropanol with about 150–170 ml. water. The pure Compound VII so prepared had a melting point of 135–137° C.

Calculated for $C_{12}H_{14}N_4O_4S$: Equ. wt.—310.32; C, 46.45%; H, 4.55%; S, 10.31%. Found: Equ. wt.—309.2; C, 46.61%; H, 4.73%; S, 10.39%.

Compound VII is practically insoluble in cold water and in benzine, soluble in hot water, very readily soluble in methanol, hot isopropanol, chloroform, glacial acetic acid, acetone, ethyl acetate, and aqueous solutions of sodium bicarbonate. Its sodium salt is freely soluble in water.

EXAMPLE 6

(a) 105 g. cyanuric chloride and 135 g. β-methoxyethanol were mixed with 139 s-collidine which was added drop by drop with cooling. The reaction mixture was stirred for about 20 hours at 45° C., whereby collidine hydrochloride was precipitated, and was then filtered. The filtrate was fractionated twice in a vacuum, and 68 g. pure 2-chloro-4,6-bis (β-methoxyethoxy)-s-triazine of B.P. 170–173° C. at 4 mm. were obtained.

(b) 29 g. 2-chloro-4,6-bis (β-methoxyethoxy)-s-triazine and 42.5 g. sodium benzylsulfonamide in 750 ml. dioxane were refluxed with agitation for about 3 hours. The reaction mixture was worked up as described in Example 4(b), and 2-benzylsulfonamido-4,6-bis (β-methoxyethoxy)-s-triazine (Compound I) was obtained initially as a viscous fluid which did not show any tendency to crystallize spontaneously even when stored for several weeks.

A crystalline product was obtained by dissolving the gummy material in just enough very dilute sodium hydroxide solution, neutralizing to pH 7 to 8, filtering, and slowly adding dilute hydrochloric acid to the filtrate with dilute hydrochloric acid. The pure product had a melting point of 140–145° C. Its equivalent weight was 280.17, whereas a value of 280.73 was calculated from $$C_8H_{13}ClN_4O_3S$$

Compound III is only slightly soluble in cold water and in benzine, but readily soluble in most other organic solvents. It dissolves in aqueous solutions of bases to form the corresponding salts. The salt solutions are practically neutral.

EXAMPLE 8

(a) 100 g. cyanuric chloride in 350 ml. methanol were mixed with about 150 g. sodium bicarbonate and 30 ml. water, and boiled for about 2 hours. The mixture obtained was stirred into water, and the insoluble material was recovered by filtration with suction and recrystallized twice from isopropanol. 65 g. 2,4,6-trimethoxy-s-triazine of M.P. 136–138° C. were obtained.

(b) 5.15 g. 2,4,6-trimethoxy-s-triazine and 6.2 g. sodium β-phenylethane-sulfonamide were refluxed with 100 to 150 ml. methanol for about 72 hours. The turbid reaction mixture was then evaporated to dryness, the residue was triturated with about 100 ml. water, and the solution obtained was saturated with $CO_2$ gas. A small amount of precipitated β-phenylethane-sulfonamide was removed by filtration, and the filtrate was acidified with dilute hydrochloric acid. It was originally oily, but soon crystallized when rubbed and seeded.

5 g. Compound IV of M.P. 108–109° C. were obtained.

EXAMPLE 9

The same compound was obtained by reacting 37.1 g. sodium β-phenylethane-sulfonamide (0.18 mole) in 500 ml. dioxane with 15.9 g. 2-chloro-4,6-dimethoxy-s-triazine (0.09 mole) according to the method described in detail in Example 5.

The crude product was recrystallized from 85 ml. isopropanol by the addition of 200 ml. water, and the yield of pure Compound IV was 19 g. (65%). It sintered at 109° C., and melted at 110–112° C. The equivalent weight was found to be 322.8 (calculated 324.35).

The afore-described 2-sulfonamido-s-triazines of the invention are relatively strong acids which can be titrated in the same manner as benzoic acid with dilute sodium hydroxide solutions and phenolphthalein indicator. The alkali metal salt solutions are generally neutral.

The salts with the alkaline earth metals are also readily soluble in water, and similarly soluble salts are formed with all relatively strong organic bases. The salts with sodium, calcium, N-methylglucamine, diethanolamine, triethanolamine are typical of the water-soluble salts of the 2-sulfonamido-s-triazines of the invention with physiologically tolerated organic and inorganic bases which are readily soluble in water and practically neutral, and therefore are readily administered orally without causing gastric or intestinal upsets. In the absence of any significant advantages of the salts with organic bases, the sodium and calcium salts are preferred.

The salts are prepared by reacting the free acidic 2-sulfonamido-s-triazines with stoichiometrically equivalent amounts of the bases or of salts of the bases with weak acids, such as sodium bicarbonate. Aqueous solutions are produced directly by dissolving the free acid compounds in the aqueous solutions of the bases. The salts may be obtained as solids by evaporation of the aqueous solutions, but they are generally hygroscopic substances which do not readily yield the last amounts of water. They are more conveniently obtained from organic solvent media, such as the lower alkanols, in which the free acid compounds are freely soluble. The base may be added to the alcoholic solution as an alcoholate. Most of the alkali metal salts are freely soluble in methanol and ethanol, and are recovered most conveniently by partial evaporation of the alcoholic medium, and dilution with inert non-solvents, such as ethyl ether.

The free acid compounds of the invention as well as their salts are effective hypoglycemic agents when applied orally. They differ somewhat in the onset and duration of their effects, as has been shown in Table 2, and a rapidly acting agent, such as Compound IV is preferably applied in a mixture with a hypoglycemic agent of the invention which shows particularly sustained action, such as Compound VI.

The dosage employed in the treatment of diabetic patients depends on the severity of the condition to be corrected, and on other therapeutic measures, such as diet, which are employed simultaneously. Typical daily applications are 150 mg. to about 2.5 g. of active agent.

The hypoglycemic agents of the invention, when in the free acid form, are compounded with pharmaceutically acceptable carriers and diluents in the usual manner to form tablets, pills, capsules, dragees, and the like. They may also be compounded with water, dispersing agents, and thickeners to form sugar free syrups. The amount of active agent in the therapeutic compositions should not be lower than 1 to 5 percent, depending on the form of the composition. Tablets should contain about 125 to 500 mg. of active agent.

When in the salt form, the 2-sulfonamido-s-triazines of the invention may be incorporated in tablets, in enterically coated dragees or capsules, but also in syrups. The sodium and calcium salts are preferred.

Sugar, lactose, levulose, starch, bolus alba, gelatin, gum arabic, yeast extract, agar-agar, gum tragacanth, methyl cellulose, pectin, stearic acid, talcum, magnesium carbonate and mang other conventional excipients are fully compatible with the hypoglycemic agents of the invention, and may be employed in the usual manner in compounding hypoglycemic compositions.

The following examples illustrate conventional methods of preparing therapeutic compositions from the 2-sulfonamide-s-triazines of the invention and their salts.

EXAMPLE 10

10.0 kg. 2 - β - phenylethanesulfonamido - 4,6 - dimethoxy-s-triazine (Compound IV) were moistened with 3500 ml. of a 1% gelatin solution, kneaded, and granulated at about 40° C. The granulate, which weighed 10.35 kg., was mixed with 1550 g. corn starch and 100 g. magnesium stearate, and 40,000 tablets each containing 250 mg. of Compound IV were prepared from the mixture on a tableting machine.

Tablets of the sodium and calcium salts of Compound IV were prepared in the same manner.

EXAMPLE 11

Dragee cores containing each 125 mg. of Compound IV and 125 mg. of Compound VI in the form of their sodium and calcium salts respectively, 33 mg. potato starch, and a little stearic acid were prepared in a conventional manner. They were provided with a coating resistant to stomach juices.

EXAMPLE 12

250 mg. batches of Compound VI in its free acid form were filled into gelatin capsules which were then sealed.

EXAMPLE 13

324 g. Compound IV, 329 g. Compound VI, and 74 g. calcium hydroxide were dissolved in enough water to make the total volume seven liters. A little vanillin and an approved coloring agent were added, and the liquid was distributed in 100 ml. bottles. One coffee spoon (about 5 ml.) of the liquid contained approximately 465 mg. of the active hypoglycemic agents of the invention.

While the invention has been described with particular reference to specific embodiments, it is to be understood that it is not limited thereto, but is to be construed broadly and restricted solely by the scope of the appended claims.

What is claimed is:

1. A compound which is a sulfonamide of the formula

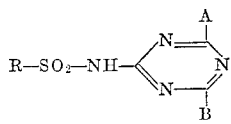

or a physiologically tolerated, water-soluble salt of said sulfonamide, in said formula R being butyl, pentyl, hexyl, phenyl-lower-alkyl, lower - alkoxy - phenyl-lower-alkyl, chlorophenyl-lower-alkyl, lower-alkyl-phenyl-lower-alkyl, or acetyl-phenyl-lower-alkyl, A being lower-alkoxy or lower-alkoxy-lower-alkoxy, and B being lower-alkoxy, lower-alkoxy-lower-alkoxy, or chlorine.

2. A compound as set forth in claim 1, wherein R is phenyl-lower-alkyl, lower - alkoxy - phenyl-lower-alkyl, chlorophenyl-lower-alkyl, lower-alkyl-phenyl-lower-alkyl, or acetyl-phenyl-lower-alkyl.

3. A compound as set forth in claim 2, wherein said salt is a sodium or calcium salt.

4. A compound as set forth in claim 2, wherein A is alkoxy having 1 to 3 carbon atoms, and B is chlorine, and said salt is an alkali or alkaline earth metal salt.

5. A compound as set forth in claim 4, wherein R is β-phenylethyl, A is chlorine, B is methoxy, or ethoxy.

6. A compound as set forth in claim 2, wherein A and B each are alkoxy having 1 to 3 carbon atoms, and said salt is an alkali or alkaline earth metal salt.

7. A compound as set forth in claim 5, wherein R is β-phenylethyl, and A and B each are methoxy or ethoxy.

References Cited

UNITED STATES PATENTS

| | | | |
|---|---|---|---|
| 3,029,123 | 4/1962 | Putter et al. | 260—249 XR |
| 3,133,059 | 5/1964 | Clark et al. | 260—249.5 XR |
| 3,255,191 | 6/1966 | Dexter et al. | 260—249.5 XR |
| 3,257,354 | 6/1966 | Dexter et al. | 260—249.5 XR |

HENRY R. JILES, Primary Examiner

J. M. FORD, Assistant Examiner

U.S. Cl. X.R.

260—248; 424—249